US010253267B2

(12) United States Patent
McLemore et al.

(10) Patent No.: US 10,253,267 B2
(45) Date of Patent: Apr. 9, 2019

(54) SEPARATOR THAT REMOVES FREE LIQUID AND PARTICLES FROM A GAS STREAM

(71) Applicant: PurScrub LLC, Katy, TX (US)

(72) Inventors: Stephen I. McLemore, Longview, TX (US); Warren Sneedon, Katy, TX (US)

(73) Assignee: PurScrub LLC, Katy, TX (US)

( * ) Notice: Subject to any disclaimer, the term of this patent is extended or adjusted under 35 U.S.C. 154(b) by 0 days.

(21) Appl. No.: 15/437,090

(22) Filed: Feb. 20, 2017

(65) Prior Publication Data
US 2017/0298279 A1 Oct. 19, 2017

Related U.S. Application Data

(60) Provisional application No. 62/319,173, filed on Apr. 6, 2016.

(51) Int. Cl.
*B01D 17/02* (2006.01)
*C10G 1/04* (2006.01)
*B01D 21/00* (2006.01)
*B01J 20/02* (2006.01)
*B01J 20/28* (2006.01)
(Continued)

(52) U.S. Cl.
CPC ............. *C10G 1/045* (2013.01); *B01D 17/02* (2013.01); *B01D 21/0003* (2013.01); *B01D 46/00* (2013.01); *B01J 20/02* (2013.01); *B01J 20/28* (2013.01); *B01J 20/28033* (2013.01); *B03D 3/00* (2013.01); *B01J 20/28002* (2013.01)

(58) Field of Classification Search
CPC ...... B01J 20/28; B01J 20/02; B01J 20/28002; B01J 20/28033; C10G 1/045; B03D 3/00; B01D 21/0003; B01D 17/02
See application file for complete search history.

(56) References Cited

U.S. PATENT DOCUMENTS 3,965,004 A * 6/1976 Garber .................. B01D 17/02
196/14.5
4,070,267 A * 1/1978 Leonard ................ C10G 1/045
208/424
(Continued)

FOREIGN PATENT DOCUMENTS

CN 101066517 A 11/2007

OTHER PUBLICATIONS

PCT/US2017/026129—International Search Report and Written Opinion of the International Searching Authority, dated Sep. 29, 2017, 14 pages.

*Primary Examiner* — Anthony R Shumate
(74) *Attorney, Agent, or Firm* — Nolte Intellectual Property Law Group

(57) ABSTRACT

A separator includes a shell: adapted to be vertically oriented in use; a combined wet gas feedstock ingress and separated liquid egress at the bottom of the shell; a separated gas egress at the top of the shell; a first permeable, fluid flow barrier disposed within the shell at the bottom end thereof proximate the ingress and comprising a first medium; a second permeable, fluid flow barrier disposed within the shell atop and proximate to the first barrier and comprising a second medium; and a third permeable, fluid flow barrier dispose within the shell at the top thereof proximate the egress and comprising the first medium, the third barrier being dispose such that there is a gap between the second and third barriers.

10 Claims, 6 Drawing Sheets

(51) Int. Cl.
*B03D 3/00* (2006.01)
*B01D 46/00* (2006.01)

(56) References Cited

U.S. PATENT DOCUMENTS

| | | | | |
|---|---|---|---|---|
| 4,671,909 A * | 6/1987 | Torobin | ............. | B01J 13/04 166/280.1 |
| 5,130,100 A * | 7/1992 | Serizawa | ............. | B01D 53/9454 422/180 |
| 5,269,886 A * | 12/1993 | Brigham, Sr. | ............. | B01D 3/14 202/176 |
| 5,565,101 A * | 10/1996 | Kuntz | ............. | B01D 17/00 210/242.3 |
| 5,601,705 A * | 2/1997 | Glasgow | ............. | B01D 17/00 210/104 |
| 8,152,897 B2 * | 4/2012 | Lindsay | ............. | C25B 15/08 204/247 |
| 8,657,897 B2 | 2/2014 | Kayat et al. | | |
| 9,636,657 B2 * | 5/2017 | Bratton | ............. | B01J 20/02 210/251 |
| 2002/0038480 A1 * | 4/2002 | Deak | ............. | B01D 15/00 8/142 |
| 2003/0150324 A1 * | 8/2003 | West | ............. | B01D 17/0211 95/268 |
| 2008/0264018 A1 * | 10/2008 | Herman | ............. | B01D 45/08 55/462 |
| 2009/0050121 A1 * | 2/2009 | Holzmann | ............. | B01D 45/04 123/573 |
| 2010/0064892 A1 * | 3/2010 | Linsday | ............. | C25B 15/08 95/254 |
| 2010/0107687 A1 * | 5/2010 | Andrian | ............. | B01D 45/02 62/620 |
| 2011/0154856 A1 * | 6/2011 | Andrian | ............. | B01D 45/16 62/618 |
| 2011/0217230 A1 | 9/2011 | Jager et al. | | |
| 2011/0233152 A1 | 9/2011 | Wieczorek et al. | | |
| 2012/0031833 A1 | 2/2012 | Ho et al. | | |
| 2013/0092639 A1 | 4/2013 | Harp et al. | | |
| 2013/0112607 A1 * | 5/2013 | Bratton | ............. | B01J 20/02 210/251 |
| 2013/0270187 A1 * | 10/2013 | Seibert | ............. | B01D 63/02 210/644 |
| 2015/0027942 A1 * | 1/2015 | Chen | ............. | B01D 36/003 210/323.2 |
| 2016/0175771 A1 * | 6/2016 | Guillou | ............. | B01D 53/265 423/215.5 |
| 2017/0100692 A1 * | 4/2017 | Olson | ............. | B01D 53/08 |
| 2017/0321936 A1 * | 11/2017 | Cho | ............. | F25B 43/00 |

* cited by examiner

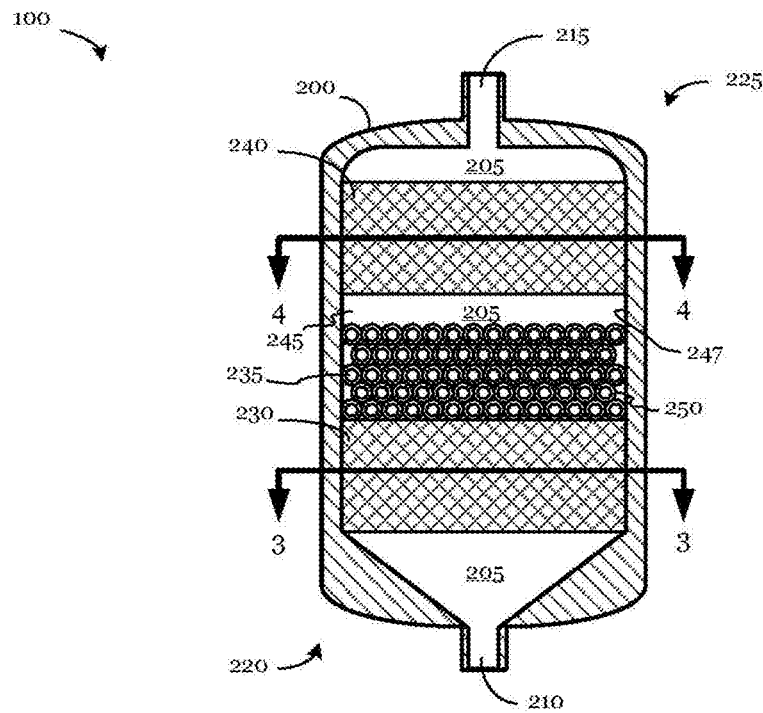
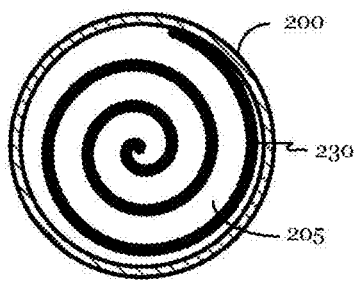
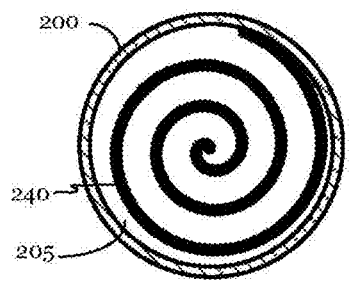
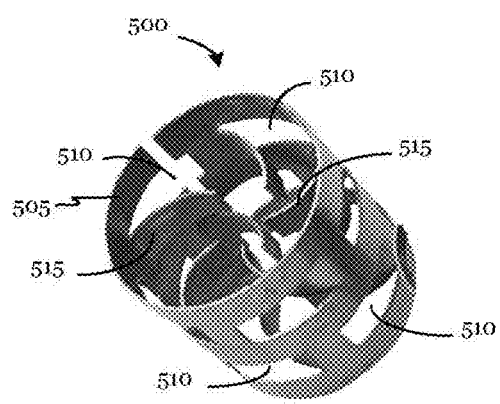
Fig. 2
Fig. 3
Fig. 4
Fig. 5

SEPARATOR THAT REMOVES FREE LIQUID AND PARTICLES FROM A GAS STREAM

CROSS-REFERENCE TO RELATED APPLICATIONS

This application claims the priority under 35 U.S.C. § 119(e) of U.S. Provisional Application Ser. No. 62/319,173, entitled, "Self-Draining Separator that Removes Free Liquid and Particles from a Gas Stream", filed Apr. 6, 2016, which is hereby incorporated by reference for all purposes as if set forth verbatim herein.

STATEMENT REGARDING FEDERALLY SPONSORED RESEARCH OR DEVELOPMENT

Not applicable.

BACKGROUND

This section of this document introduces various information from the art that may be related to or provide context for some aspects of the technique described herein and/or claimed below. It provides this information to facilitate a better understanding of that which is disclosed herein. This is a discussion of "related" art. That such art is related in no way implies that it is also "prior" art. The related art may or may not be prior art. The discussion in this section is to be read in this light, and not as an admission of prior art.

Hydrocarbons extracted from the ground typically contained a mixture of liquids, gasses, and particulates. For example, a natural gas well might yield a production stream of natural gas in which various liquids, known as "free liquids", may be found. Examples of such free liquids include water, brine, kerosene, oils, condensate, ethylene glycol ("MEG"), drilling fluids, etc. The production stream may also include particulates, such as sand or other sediments.

The production stream moves under pressure through a series of lines for collection and processing. It may encounter a variety of equipment in the course of its travels that serve one purpose or another depending on the end use of the production stream. In the context of the natural gas well production stream, the free liquids and particulates can damage the equipment. Over time, the damage may accumulates to the point where repair or replacement of the equipment may be needed.

The presently disclosed technique is directed to resolving, or at least reducing, one or all of the problems mentioned above. Even if solutions are available to the art to address these issues, the art is always receptive to improvements or alternative means, methods and configurations. Thus, there exists and need for technique such as that disclosed herein.

SUMMARY

In a first aspect, a separator, comprises: a shell adapted to be vertically oriented in use; a combined wet gas feedstock ingress and separated liquid egress at the bottom of the shell; and a separated gas egress at the top of the shell. Disposed within the shell is a first permeable, fluid flow barrier disposed within the shell at the bottom end thereof proximate the ingress and comprising a first medium; a second permeable, fluid flow barrier disposed within the shell atop and proximate to the first barrier and comprising a second medium; and a third permeable, fluid flow barrier disposed within the shell at the top thereof proximate the separated gas egress and comprising the first medium, the third barrier being disposed such that there is a gap between the second and third barriers.

In a second aspect, method for separating gas from liquid in a pressurized wet gas feedstock, comprises: feeding the wet gas feedstock upward through a first port at the bottom of a shell; passing the wet gas feedstock through a first permeable, fluid flow barrier comprising a first medium; a second permeable, fluid flow barrier comprising a second medium; a gap; and a third permeable, fluid flow barrier comprising the first medium, to induce a Bernoulli effect in conjunction with the shell and separate a liquid from a gas in the feedstock; removing the separated gas from the shell through a second port at the top of the shell; and draining the separated liquid through the first port through gravity.

In a third aspect, a separator, comprises: a shell adapted to be vertically oriented in use and defining an inner diameter; a combined wet gas feedstock ingress and separated liquid egress at the bottom of the shell; and a separated gas egress at the top of the shell. The separator further comprises means for inducing a Bernoulli effect in the feedstock in conjunction with inner diameter of the shell, separating a liquid and a gas in the feedstock, and draining the separated liquid through the combined ingress and egress.

The above paragraph presents a simplified summary of the presently disclosed subject matter in order to provide a basic understanding of some aspects thereof. The summary is not an exhaustive overview, nor is it intended to identify key or critical elements to delineate the scope of the subject matter claimed below. Its sole purpose is to present some concepts in a simplified form as a prelude to the more detailed description set forth below.

BRIEF DESCRIPTION OF THE DRAWINGS

The invention may be understood by reference to the following description taken in conjunction with the accompanying drawings, in which like reference numerals identify like elements, and in which:

FIG. 2 illustrates the separator of FIG. 1 in isolation.

FIG. 3 is a cross-section of the separator of FIG. 1-FIG. 2 taken along line 3-3 in FIG. 2.

FIG. 4 is a cross-section of the separator of FIG. 1-FIG. 2 taken along line 4-4 in FIG. 2.

FIG. 5 illustrates one exemplary pall ring used in one particular embodiment of the separator of FIG. 1-FIG. 2.

FIG. 8A being sectioned along line to 8A-8A in FIG. 8B

While the invention is susceptible to various modifications and alternative forms, the drawings illustrate specific embodiments herein described in detail by way of example. It should is be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be further appreciated that such a development effort, even if complex and time-consuming, would be a routine undertaking for those of ordinary skill in the art having the benefit of this disclosure.

A separator and its use are disclosed to remove free liquids and sediment from a gas stream are disclosed herein. By removing the free liquids and sediments, it delivers clean dry gas to run processing equipment and protect valuable instrumentation and equipment from damage from salt water or various liquids. The product uses a combination of multiple filter media. These media consist of different filter elements placed inside the shell chamber. When properly installed the gas flow and pressure from the well head drives the liquid and sediment through the filter media and then sucks the liquid back out leaving clean dry gas to operate instrumentation and other processing equipment.

Figure 1:
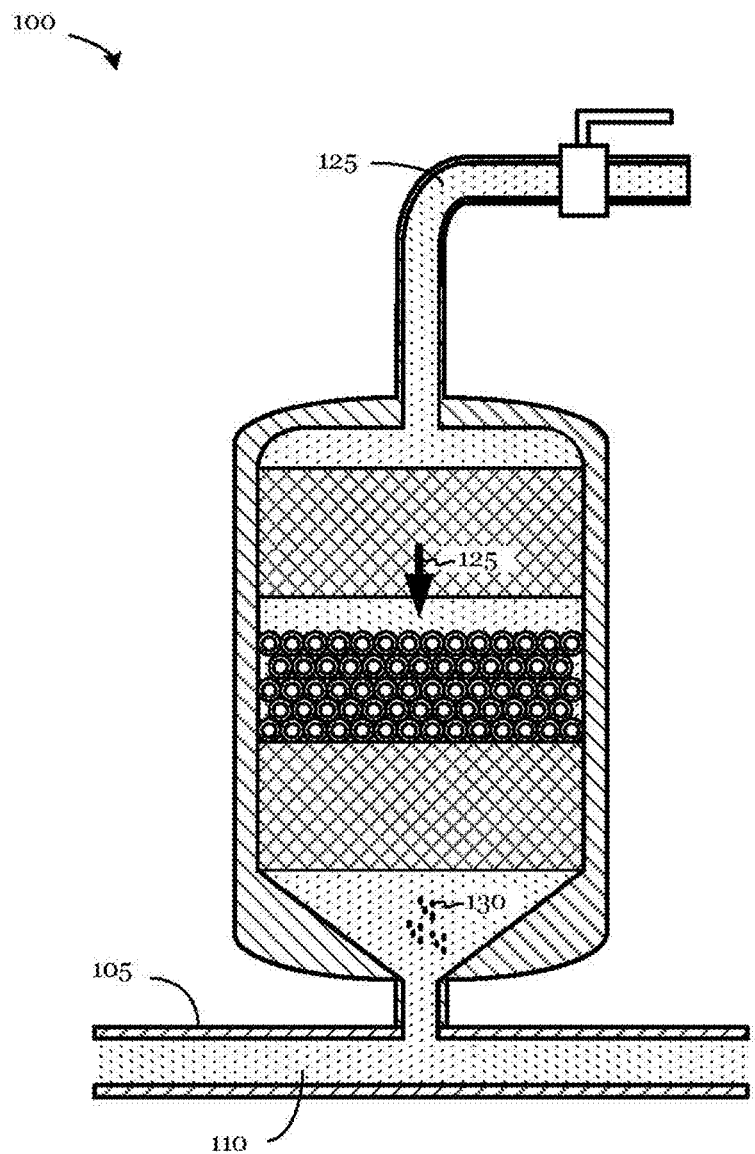
FIG. 1 is a conceptualized illustration of a separator in accordance with the techniques described herein in which the separator is shown in a plan, partially sectioned view.

Turning now to FIG. 1, a separator 100 in accordance with the techniques described herein in which the separator is shown in a plan, partially sectioned view for a conceptualized illustration. The separator 100 is shown installed on a line 105 in a manner described more fully below. The line 105 is a part of a gas wellhead not otherwise shown. The line 105 carries a wet gas feedstock 110. The wet gas feedstock 110 includes, as is described above, gas, free liquids, and particulates, none of which as separately shown. The wet gas feedstock is traveling left to right in the drawing as indicated by the arrow 115.

The wet gas feedstock is, in this particular embodiment, obtained from a natural gas well. Accordingly, the gas is natural gas. The free liquids might therefore be, for example, brine or water and the particulates some kind of sediment. However, those in the art having the benefit of this disclosure will appreciate that the separator disclosed herein will have applications outside of the context of hydrocarbon wells. Thus, the identity of the gas, free liquids, and particulates will be a function of the context in which the separator is used.

Referring now to FIG. 2, the separator 100 is shown in isolation. The separator 100 comprises a shell 200 adapted to be vertically oriented in use. The shell 200 defines a chamber 205, a port 210, and a port 215. The port 210 is a combined wet gas feedstock ingress and separated liquid egress at the bottom 220 of the shell 100. The port 215 is a separated gas egress at the top 225 of the shell 100. The functionality of the ports 210, 215 will be discussed more fully below.

The separator 100 also includes three permeable, fluid flow barriers 230, 235, 240, all disposed within the shell 200. The first permeable, fluid flow barrier 230 is located at the bottom end 220 proximate the ingress—i.e., the port 210—and comprises a first medium. The second permeable, fluid flow barrier 235 is located atop and proximate to the first barrier 230 and comprises a second medium. The third permeable, fluid flow barrier 240 is disposed within the shell 200 at the top end 225 thereof proximate the egress—i.e., the port 215—and comprises the first medium as well. The third barrier 240 is disposed such that there is a gap 245 between the second and third barriers 235, 240.

Referring now to FIG. 2 in conjunction with FIG. 3-FIG. 4, the first and third barriers 230, 240 are, in this particular embodiments, "mist pads". The first medium from which they are constructed is a woven metal mesh wound about a central point and then inserted into the shell 200 as better shown in FIG. 3 and FIG. 4. The wound mesh is then positioned within the chamber 205 and is held in position by a friction fit between the mesh and the wall 247 of the chamber 205 and then welded.

The size of the openings in the mesh of the first medium will be a function of the materials to be separated. The openings should be large enough to separate the constituent gas, free liquid, and particulates as described below without unduly hampering flow through the barriers 230, 240. Determining the proper sizing for any given wet gas feedstock is largely a function of trial and error testing. As noted above, the illustrated embodiment is designed for use with natural gas production streams. The mesh is therefore a 9# mesh.

The length and the width of the mesh and the tightness of the wind is a function of a number of factors. These factors include not only the goal of separating the constituents, but also the mesh that is available, the pressure under which the wet gas feedstock 110 enters the separator 100, and the inner diameter of the chamber 205, among others. In the illustrated embodiment, the 9# mesh is a 27" long×6" wide strip wound sufficiently to be inserted into the 2' wide chamber and maintain a friction fit until welded. Thus, the height of the first and third barriers 230, 240 in FIG. 1-FIG. 2 is 6" and the diameter of the chamber 205 is 2' in the illustrated embodiment.

The materials from which the mesh is constructed admits variation as well. In general, such meshes are manufactured as an expanded metal. Although this is not required, it may inform a given embodiment. The elements of the wet gas feedstock 110 are typically corrosive and, as mentioned above, include free liquids. The material should also therefore be selected to resist rust and corrosion. They should also be sufficiently ductile so that the winding does not compromise the integrity of the mesh and, when wound, have sufficient spring to make and keep the friction fit during manufacture. Suitable metals in various embodiments may include ceramic, plastic, stainless steel, carbon steel, etc.

As mentioned above, the second barrier 235 is comprised of a second medium that is different from the first medium. In the illustrated embodiment, this second medium is a random packing in the form of a plurality of Raschig rings, also known as "rashing rings". More particularly, the illustrated embodiment uses a type of Raschig ring known as a "pall ring". Pall rings are known to the art, and the illustrated embodiment uses ⅝" pall ring available from AMACS Separation Products, Inc. One such pall ring 500 is shown in FIG. 5.

Pall rings are designed to induce a pressure drop and flow disruption in fluid flow. According to the manufacturer AMACS, the particular pall ring design used in the illustrated embodiment minimizes contours and crevices that might cause liquid hold-up and entrainment while providing he gas and liquid transfer rates. It includes opened cylinder walls 505 defining openings 510 therein and bent protrusions 515 to relatively increase capacity and lower pressured drops relative standard Raschig rings. The openings also help maintain even distribution and resist wall-channeling tendencies. The contacting surfaces of the walls 505 and protrusions 515 also provide effective distribution of liquids and gasses while resisting plugging fouling and nesting.

While the present embodiment uses pall rings, other embodiments may use other types of Raschig rings as are known to the art. Such rings may be injection molded of plastics, molded of ceramics or press-formed from metal sheet. As with the mesh, materials selection should considered the wet and corrosive nature of the materials being separated. In the illustrated embodiment, the pall rings 500 are fabricated of 316L stainless steel and are 5/8" in size, although other materials may be used in alternative embodiments.

FIG. 1 and FIG. 2 conceptually illustrate the second, permeable fluid flow barrier 235 comprised of pall rings 250 such as the pall rings 500 of FIG. 5. The pall rings 250 are shown stacked neatly atop first barrier 230 and uniformly oriented in the same direction. As random packing, this is unlikely to be the case in any given embodiment. The orientation of the pall rings 250 is not material and will most likely in fact he random in most embodiments.

The one exception is that they be placed and positioned to define the gap 245 between the second and third barriers. The gap 245 aids in creating the Bernoulli effect that separates the elements of the wet gas feedstock 110 in the manner described below. It also allows the pall rings to move freely and help provide more efficient separation. The width of the gap 245 will also be a function of several factors such as the identity of the elements of the wet gas feedstock 110, the pressure under which the wet gas feedstock 110 enters the separator 100, and the inner diameter of the chamber 205, among others. In the illustrated embodiment, the gap 245 is approximately 2" wide.

Figure 6A:
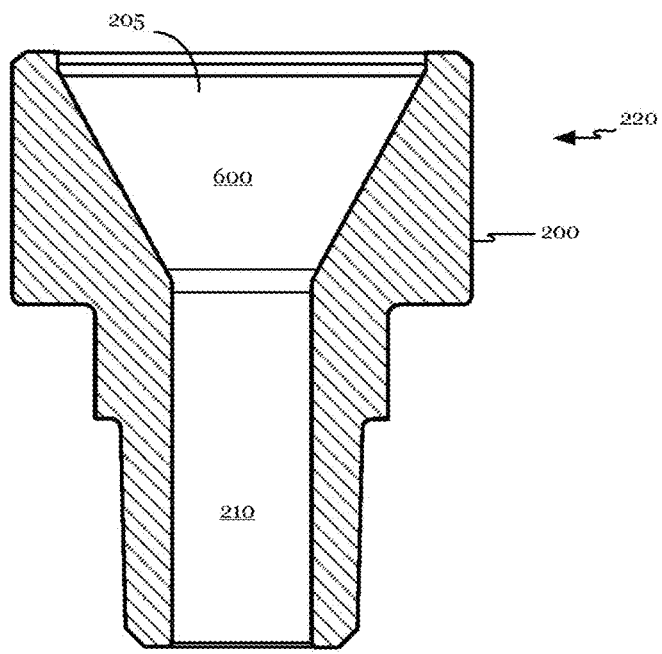
FIG. 6A-FIG. 6B illustrate one particular shell bottom for the separator of FIG. 1-FIG. 2, FIG. 6A being sectioned along line 6A-6A in FIG. 6B.
Figure 6B:
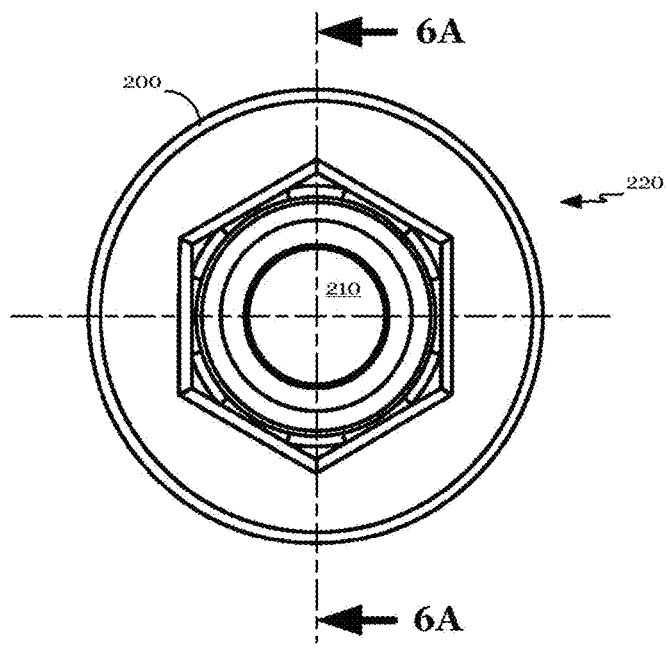

The particular embodiment illustrated in FIG. 1-FIG. 4 includes a feature that facilitates its self-draining functionality. As shown in FIG. 6A, the bottom end 220 of the container 100 defines as a part of the chamber 205 a throat 600, which is a sectioned cone, to the port 210. FIG. 6B is a bottom view of this particular embodiment showing the bottom end 220.

Figure 7A:
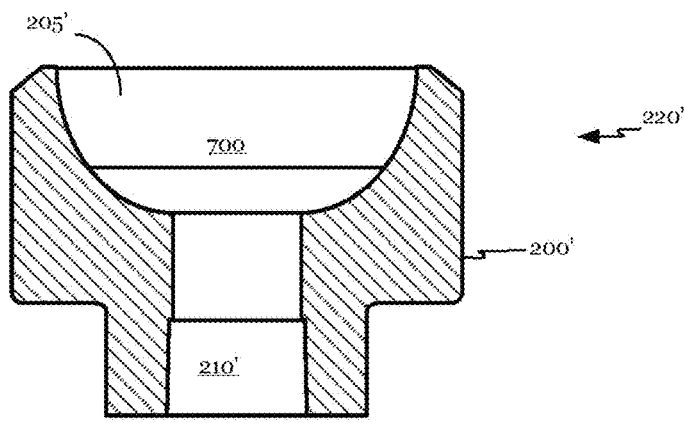
FIG. 7A-FIG. 7B illustrate one particular shell bottom for the separator of FIG. 1-FIG. 2 alternative to that shown in FIG. 6A-FIG. 6B, FIG. 7A being sectioned along line 7A-7A in FIG. 7B.
Figure 7B:
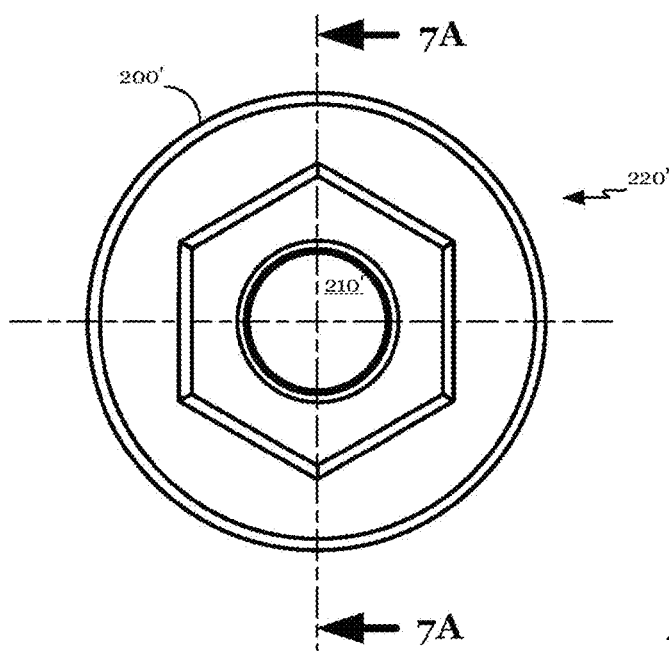

However, this aspect of the design admits variation. FIG. 7A-FIG. 7B illustrate a bottom end 220' alternative to the bottom end 220 of FIG. 6A-FIG. 6B. In the bottom end 220'. As shown in FIG. 7A, the chamber 205' includes a gullet 700 funneling separated liquids and particulates to the port 135'. The gullet 700 differs from the throat 600 in FIG. 6A in that the wall 705 gently slopes to the port 135' Note also from FIG. 7A-FIG. 7B that the design of the bottom end 220' differs also.

Figure 8A:
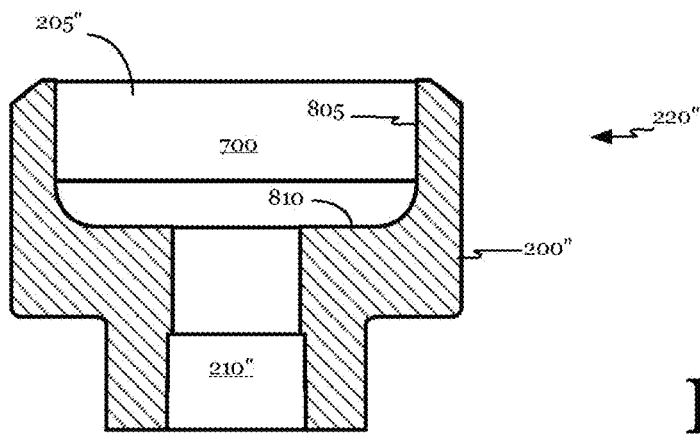
FIG. 8A-FIG. 8B illustrate one particular shell bottom for the separator of FIG. 1-FIG. 2 alternative to that shown in FIG. 6A-FIG. 6B.
Figure 8B:
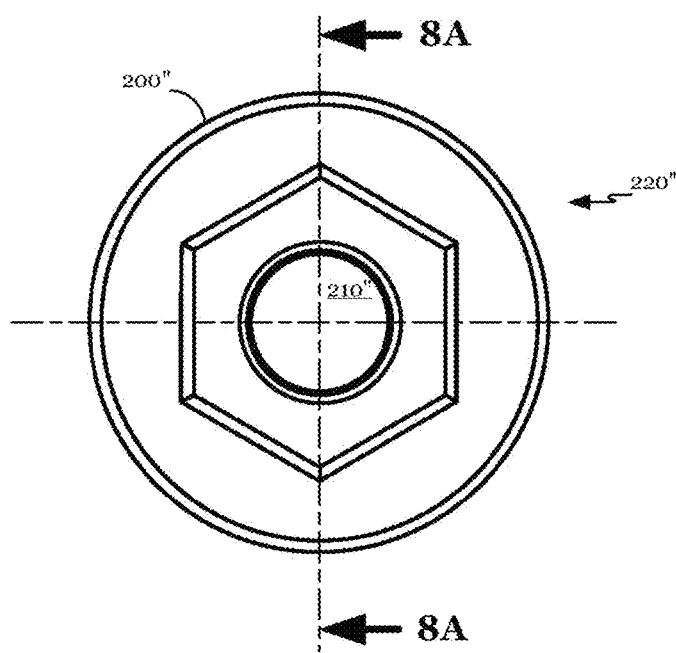

FIG. 8A-FIG. 8B illustrate another alternative to the design of the bottom end 220 in FIG. 6A-FIG. 6B. The bottom end 220" defines a chamber 205" that is what might be considered squared off in that the wall 805 runs vertically down to the floor 810 of the chamber205" without incline toward the port 210". Note, again, the differing design for the bottom end 220".

The incline in the walls facilitate the self-draining aspect of the separator disclosed herein. The squared off bottom end 220" in FIG. 8A-FIG. 8B is more likely to suffer from a buildup of particulates that might impair the function of the separator as a whole. Conversely, the throat600 in FIG. 6A will help mitigate this concern considerably while the gullet 700 in FIG. 7A will also, albeit to a lesser degree. Note that particulate buildup is not a significant concern once the particulates drain from the separator as the force exerted by the fluid flow of the wet gas feedstock will tend to sweep it away.

Referring now to FIG. 2 and FIG. 6B, the shell 200 can be supplied in any number of diameters and lengths and comprises the outer container of the separator 100. The first, second, and third permeable fluid flow barriers 230, 235, 240 components make up the filtering media. These can be supplied in numerous mesh sizes and surface areas depending on the required degree of sediment filtering required. In general, each of these components is commercially available and specifications for the materials and parts will be determined according to the end use of the separator 100 in any given embodiment.

Once the diameters lengths and filtering media requirements are determined, the components are assembled in the following order. The proper media for the third barrier 240 is fitted into the shell 200. The third barrier 240 engages the shell 200 through a friction fit that maintains the third barrier 240 in its position. The pall rings 250 are then placed inside the shell 200. The first barrier 230 is then fitted into the shell 200. The first barrier 230 also engages the shell 200 in a friction fit that maintains it in position. Note that the first barrier 230 is positioned so that the pall rings are free to move and to provide the gap 245. The fabricated separator is then hydrostatically tested for the specified pressure rating before blasting and painting for in field installation.

Returning to FIG. 1, in the illustrated embodiment, the separator 100 is installed as a branch off the flow line 105 from the gas well. The liquefied gas forms a wet gas feedstock 110 and is pushed into the separator 100 by the pressure of the flow line 105. By passing this liquid gas, wet gas feedstock 110 through the separator 100, the multi-media filter elements (i.e., the barriers 230, 235, 240) remove free liquids and sediments in the stream as represented by the arrow 125. The separated liquid and sediment 130 is sucked back out the separator 100 from the force of the flow in the flow line 105 and the clean dry gas 120 is pushed out the top end 225 to run instruments and other equipment (not shown) without the corrosive liquid or damaging sediments. The process then repeats itself for continuous, maintenance free operation.

More particularly, and referring to FIG. 1-FIG. 2, the wet gas feedstock 110 is flowing under pressure through the flow line 105 as was mentioned above. This pressure forces a portion of the wet gas feedstock 110 up and into the separator 100 through the port 210. The pressure furthermore forces the wet gas feedstock 110 through the barriers 230, 235, 240 and the gap 245. The shape of the scrubber unit naturally creates the Bernoulli effect in conjunction with the barriers 230, 235, 240 and air gap 245, which create an enhanced separation of the free liquids and particulates.

The Bernoulli effect in conjunction with the barriers 230, 235, 240 operates differently on the constituent gas, free liquid, and particulates in the wet gas feedstock 110. They help create different velocities among the constituents that separates the gas from the free liquid and particulates Gravity acts on all three constituents during this process, and the mass of the separated free liquid and particulates 130 under gravity overcomes the upward pressure from the flow line105 and they fall back to the bottom of the separator 100. However, the pressure is sufficient to push the separated gas 120 out the port 215. The separated free liquid and particulates 130 then drain out the port 210 back into the flow line 105.

The sizes of the openings in the filtering media, the nature of the filtering media, and the placement of the filtering media (i.e., the barriers 230, 235, 240) are determined for this application so that the separator 100 delivers the most efficiently clean and dry gas as tested. By adjusting the sizes of the openings, the nature of the media, and placement of the media, the separator 100 can be used in any liquid/sediment pressurized flow line that requires the operation of instruments or equipment from a source of pressurized gas or air.

Figure 9:
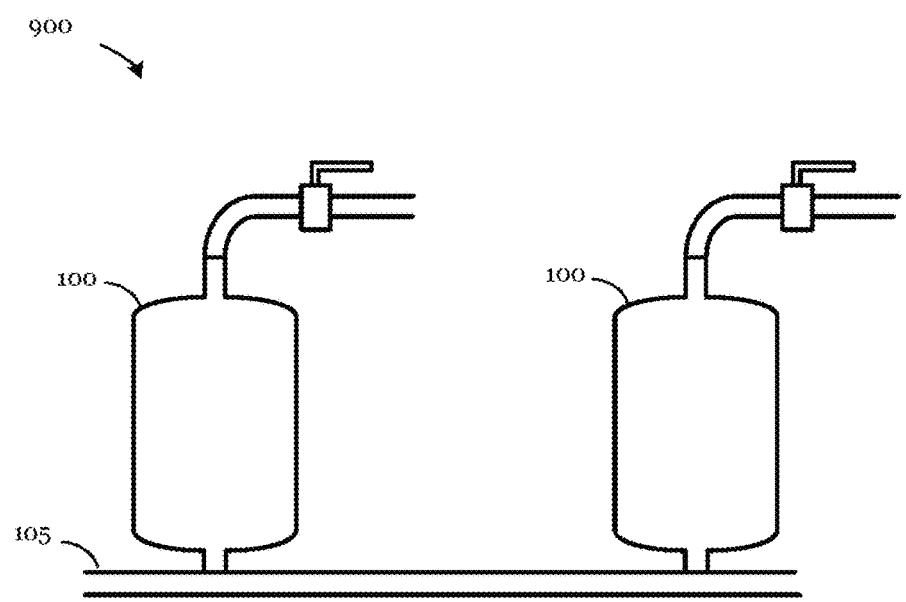
FIG. 9 depicts a portion of an installation in which two separators such as the separator of FIG. 1-FIG. 2 are used.

It may also be desirable to use multiple separators 100 in some circumstances. FIG. 9 illustrates an installation where two separators 100 are used in serial, each of which receives the original wet gas feedstock. Note, however, that there could be liquid carryover in some of these variations and any given design should be tested for such.

The separator described above and claimed below will remove free liquids and particulates from a gas stream. By doing so, it delivers clean dry gas to run processing equipment and protect valuable instrumentation and equipment from damage from salt water or various liquids. it therefore replaces, or at least mitigates, the industry standard approach of providing certain maintenance on or replacing instrumentation and equipment that the separator described herein is designed to protect.

There are some terms used herein that may be relative in nature in sonic respect. Examples include "vertically oriented", "top", "bottom", as well as others. Each of these terms are used in reference to the intended orientation of the separator in its intended use—i.e., as shown in FIG. 1. Furthermore, the technique described herein may be used in separators for a variety of application, including applications that require dry lines on the downside of a compressor that would have condensation.

This concludes the detailed description. The particular embodiments disclosed above are illustrative only, as the invention may he modified and practiced in different but equivalent manners apparent to those skilled in the art having the benefit of the teachings herein. For example, some embodiments may replace the single machine piece of the illustrated embodiments with separate cylinder, bull plug, and swage nipple. Thus, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for separating gas from liquid in a pressurized wet gas feedstock, comprising:
    feeding the wet gas feedstock upward through a first port at the bottom of a shell;
    passing the wet gas feedstock through a first permeable, fluid flow barrier comprising a first medium; a second permeable, fluid flow barrier comprising a second medium; a gap; and a third permeable, fluid flow barrier comprising the first medium, to separate a free liquid from a gas in the feedstock;
    removing the separated gas from the shell through a second port at the top of the shell; and
    draining the separated liquid through the first port through gravity.

2. The method of claim 1, wherein the free liquid is water, brine, kerosene, oils, condensate, or ethylene glycol.

3. The method of claim 1, where passing the feedstock also separates particulates from the gas.

4. The method of claim 1, wherein the gas is natural gas or air.

5. The method of claim 1, wherein the feeding, passing, removing, and draining are iterated on the separated gas.

6. The method of claim 1, wherein feeding the wet gas feedstock includes feeding a portion of a stream.

7. The method of claim 6, wherein draining the separated liquid includes draining the liquid into the stream.

8. The method of claim 7, wherein the feeding, passing, removing, and draining are iterated on the stream after the separated liquid is drained into the stream.

9. The method of claim 6, wherein the feeding, passing, removing, and draining are iterated on the stream after the portion is fed.

10. A separator, comprising:
    a shell adapted to be vertically oriented in use and defining an interior diameter;
    a combined wet gas feedstock ingress and separated liquid egress at the bottom of the shell;
    a separated gas egress at the top of the shell; and
    means for separating a liquid and a gas in the feedstock, and draining the separated liquid through the combined ingress and egress.

* * * * *